United States Patent [19]

Maubois et al.

[11] 4,205,090

[45] May 27, 1980

[54] PREPARATION OF CHEESE USING ULTRAFILTRATION

[75] Inventors: Jean-Louis J. Maubois, Rennes; Germain P. C. B. Mocquot, Versailles; Louis J. Vassal, Jouy En Josas, all of France

[73] Assignee: Etablissement Public: Institut National de la Recherche Agronomique, Paris, France

[21] Appl. No.: 637,981

[22] Filed: Dec. 5, 1975

Related U.S. Application Data

[63] Continuation of Ser. No. 299,837, Oct. 24, 1972, abandoned, which is a continuation-in-part of Ser. No. 53,002, Jul. 7, 1970, abandoned.

[30] Foreign Application Priority Data

Jul. 18, 1969 [FR] France ............................... 69.24555
Oct. 22, 1971 [FR] France ............................... 71.38091

[51] Int. Cl.$^2$ ............................................. A23C 19/02
[52] U.S. Cl. ...................................... 426/40; 426/36; 426/491
[58] Field of Search .................... 426/36, 42, 40, 582, 426/490, 491

[56] References Cited

PUBLICATIONS

Lancelot, et al., La Fromagerie de l'An 2000, La Technique Laitere, No. 3, 1960 (pp. 13-17).

Michaels, A. S., New Separation Technique for the CPI, Chemical Engineering Progress, vol. 64, No. 12, 1968 (pp. 31-43).

Michael, A. S., Ultrafiltration, Booklet No. 905, Amicon Corporation, Lexington, Mass., Mar. 1968 (pp. 1-27).

Kosikowski, F., Cheese and Fermented Milk Food, Published by the Author, Cornell University, N.Y., 1966 (pp. 400-406).

*Primary Examiner*—David M. Naff
*Attorney, Agent, or Firm*—Oblon, Fisher, Spivak, McClelland & Maier

[57] ABSTRACT

Cheese is prepared by ultrafiltering a milk product to produce a cheese milk having substantially the composition of cheese at the end of whey drainage and converting the cheese milk into cheese by coagulation with rennet.

16 Claims, 2 Drawing Figures

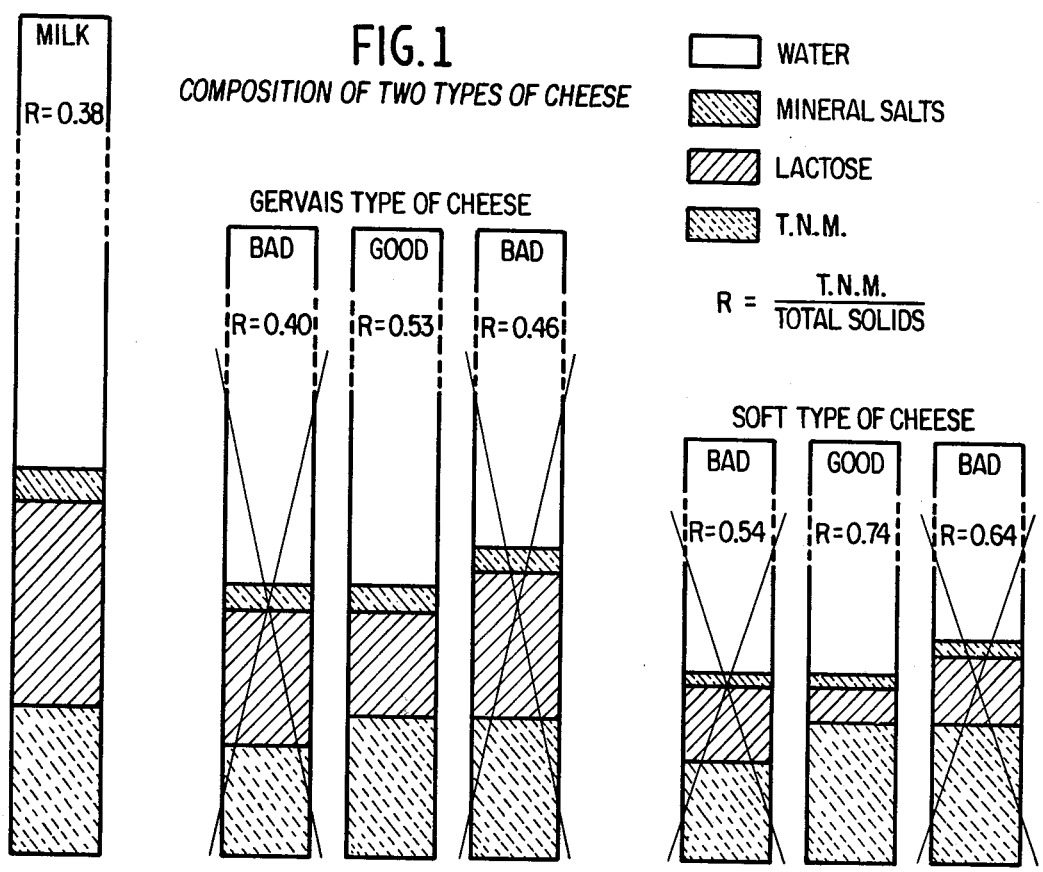
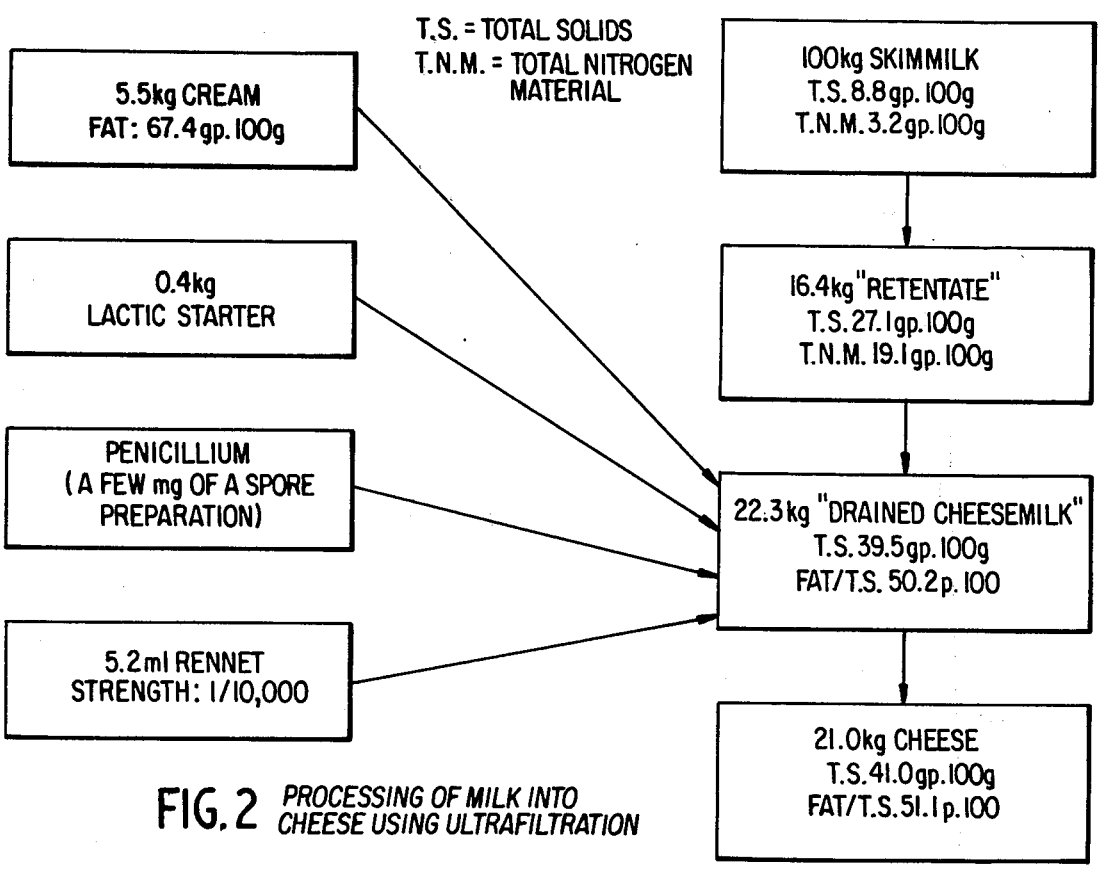

PREPARATION OF CHEESE USING ULTRAFILTRATION

CROSS-REFERENCES TO RELATED APPLICATIONS

This application is a continuation of application Ser. No. 299,837 filed Oct. 24, 1972, now abandoned, which is a continuation-in-part of application Ser. No. 53,002, filed July 7, 1970, now abandoned.

BACKGROUND OF THE INVENTION

1. Field of the Invention

More particularly, the invention relates to a method of processing milk and dairy products, and especially to such a method whereby a liquid enriched cheese milk or liquid retentate product suitable for conversion into cheese may be obtained.

The invention has for its object a process which makes it possible to obtain, starting from milk, a liquid filtration product (filtrate) containing the major part of the liquid content and a major part of the co-called soluble constituents of the initial milk, such as lactose, mineral salts, non-protein nitrogen substances; the percentages at which those various substances are present in this liquid filtrate being, in principle, equal or close to the respective percentages at which they are present in the aqueous phase of milk; and on the other hand, a liquid retentate containing all, or substantially all, the proteins of the initial milk and a minor part of the so-called soluble constituents; the protein content and the soluble constituents content of this liquid being substantially equal to those existing in a cheese prepared from milk at the end of the whey drainage process. Thus, a notable object of the invention is a process making it possible to prepare from milk, such as secreted by the milch-animal, a liquid raw material having substantially the composition of a drained cheese except for its enrichment in soluble proteins, in which the ingredients are present in proportions appropriate for cheese-making.

Thus, it is one object of the invention to provide a process which makes it possible to prepare from milk a retained ultrafiltration liquid raw material, or liquid retentate, suitable for conversion into drained cheese.

2. Description of the Prior Art

In previously known cheese-making processes, the curd is obtained by coagulation of milk as derived from the milch animal, or after fat separation, with rennet. Then, the curd is separated from the whey by drainage, with or without pressing in moulds as it is usually done when making soft cheese, fresh or ripened. On the other hand, when making hard pressed cheese or cooked cheese, the curd is cut and mechanically stirred and heated at varying intensities and then the curd is subjected to decantation and a drawing off of the whey.

In standard cheese making practice, the technological operations carried out from the stage where the milk is coagulated in vats up to the stage where the cheese is drained and moulded are costly in terms of labor and equipment, and the cheese obtained is heterogeneous or variable from the three standpoints of quality, composition and weight of each cheese. Indeed, in the present stage of the art, it is very difficult, if not impossible, to control and to adjust with sufficient accuracy, prior to clot formation with rennet, all the parameters which determine the characteristics of the final cheese.

If the variation in weight from one individual cheese to another has relatively little importance for pressed or cooked types of cheese, which are sold on the basis of their weight, the same does not apply at all for soft cheese, which is sold on an individual cheese basis. In all countries producing soft cheese, the loss or profit, due to the extent or the safety margins adopted by the cheese maker to make up for this variation in weight, represents quite an appreciable percentage of the total turnover. The variation in composition is partly the result of the difficulties experienced during the cheese making operations in heating, cutting or stirring a gel; i.e. the clot formed by the rennet, in which the thermal or mechanical exchanges are much more difficult than inside a liquid. While mixing a liquid as obtained, for instance, by this invention, is easy and insures equal distribution of heat, etc., the same does not hold true for a gel. As regards variation in quality, this is to a large extent the result of the two foregoing factors.

Prior art processes are known for performing in continuous manner the production of curd and thus rationalizing manufacture. In one of these processes, the normal milk, renneted cold, is heated in a heat exchanger; it coagulates and circulates in this form in a coagulation cylinder. In another known process, the milk concentrated by evaporation is heated by mixing it with warm water. Coagulation then takes place instantaneously. Other processes mechanize syneresis (whey drainage) of the clot obtained by the action of the rennet.

However, all these previously known processes have drawbacks and the resulting products are as variable as those obtained by the standard cheese making technique for, as in the latter case, the whey drainage takes place subsequently to coagulation. In addition, the field of application of these various processes is rather narrow and they may be difficult to use because the raw material (i.e. milk) may vary to quite a marked extent (the composition of milk varies according to season, area, etc.). This, in turn, may prevent certain technological requirements associated with these processes from being satisfied. Moreover, these processes require for their implementation installation which are fairly cumbersome.

OBJECTIVES

Thus, this invention has for an object a method of continuously or discontinuously processing milk which makes possible their conversion into food products of a cheese type, and which does not present the drawbacks of the known processes of cheese making briefly illustrated above.

Another object of the invention is a method for processing milk and by-products from milk by ultra-filtration or reverse osmosis, having in mind the obtainment of a liquid retentate product having substantially the same lactose to protein ratio, fat to protein ratio, mineral and solid content as a cheese; said liquid retentate or enriched cheese milk being afterwards converted into cheese by adding rennet and a starter of lactic acid bacteria and allowing it to ripen into a cheese. In the parent U.S.A. application, this enriched cheese milk was, at times, called "pre-cheese."

As far as it is known, it has never been proposed in the cheese art to obtain directly from milk an enriched liquid retentate product that can be converted to a cheese.

THE METHOD AND PRODUCT THEREOF

The invention comprises a method of forming a liqud retentate, or enriched cheesemilk product, by processing a liquid dairy product such as milk. The method comprises the steps of separating said liquid dairy product into a first ultrafiltrate liquid component and a second liquid retentate component by placing said dairy product in contact with a semi-permeable membrane the average pore diameter of which is at most equal to 30m$\mu$, at a pressure of from 1 to 50 kg/cm$^2$ and under proper flow conditions, such as turbulent flow and/or imparting a laminar flow to the dairy product. The first liquid component is the filtration liquid that passes through the semi-permeable membrane. The second liquid component is the retentate that does not pass through the semi-permeable membrane; it has a higher concentration, more particularly in proteins, than said first liquid component. In the process we collect the first liquid component, and continue to separate the second liquid component into further liquid components by maintaining said second liquid component in contact with said semi-permeable membrane under the foregoing conditions until the desired liquid retentate composition is obtained.

The above sequence of operations will be continued until such time as it obtained a liquid retentate or enriched cheesemilk product, which does not pass through the semi-permeable membrane and which has an enriched protein concentration (i.e. content) and other milk component content substantially equal to that of the cheese one wishes to produce.

Using the invention, it is possible to process all the types of milk or dairy by-products previously used for the manufacture of cheese. The starting liquid may be cow's, goat's or ewe's milk, which may be subjected in known manner to a moderate heating prior to treatment according to the invention.

The milk product to be processed in contact with a semi-permeable membrane is placed under pressure and typically a turbulent flow and/or a laminar flow is imparted to the liquid milk product in contact with the membrane. Both types of flow agitate the liquids adjacent to the membrane and permit the obtaining of a higher content of solids in the retained liquid tenate.

The pressure applied to the milk product in contact with the membrane can be applied with a pump and/or with an inert gas under pressure, such as nitrogen.

Various types of membranes were used to prepare the retentate. Membranes available on the market are made either from polyolefines (as is the case for membranes sold under the trade name "Diaflo" by the firm Amicon, U.S.A.), or from polyacrylonitrile or polyvinylchloride (as is the case for membranes sold by the firm Rhone-Poulenc, France), or from cellulose acetate (as is the case for membranes sold by the firms De Danske Sukkerfabriker, Denmark and Abcor, U.S.A.).

The essential characteristics of the membranes which must be used in our process are as follows:

(1) the diameter of their pores, should be at the most 30 m$\mu$;

(2) no retention of the soluble milk components (lactose and mineral salts) should be detected. In other words the membrane must be such that the lactose content in the aqueous phase of the retentate must be equal to the lactose content in the aqueous phase of milk.

(3) the constituents of the membrane must raise no objection from the sanitary and hygienic viewpoint.

In this process, the liquid product which does not pass through the membrane is used as a base to manufacture cheese. In the present description, this liquid which does not pass through the membrane is referred to as the "liquid retentate". The "liquid retentate" is a protein-enriched milk (from skim milk) or fat and protein enriched milk (from whole milk).

The new product which is prepared from the new "liquid retentate" is referred to as the "drained cheesemilk". Later on, the cheese is manufactured from such a "drained cheesemilk". To be explicit, especially when using skim milk, the expression "drained cheesemilk" designates, in the present description, a product containing the "retentate" to which a certain amount of cream has been added. This drained cheesemilk can be converted to the specific cheese desired. For each type of cheese there is a well defined "drained cheesemilk." In other words, this product has substantially the same composition as a drained cheese and it is used to prepare cheese, but it is still a liquid (just as milk is a liquid) and not a gel or a curd. This is the reason why the word "milk" is used to differentiate this liquid from the "curd" which is usually obtained in ordinary cheese making. Hence, the term "drained cheesemilk" may be used to give a complete description of the product.

To complete our definition of terms: the gel obtained by adding rennet and lactic acid starter bacteria, coloring matter, etc., to the "drained cheesemilk" is designated as "curd", i.e. the same word which is used in ordinary cheese making to designate either the milk which has just undergone clotting through rennet action (the word "junket" is also sometimes used at this particular stage) or the product which has undergone a more or less pronounced "syneresis", with corresponding release of moisture. The "curd" obtained in our process obviously corresponds to the last stage of curd syneresis in traditional cheese making.

In most of our experiments, we preferred to carry out ultrafiltration with skimmed milk instead of with milk having the fat content usually found in cheese. The fat content can be adjusted after ultrafiltrating. However, ultrafiltration of milk with a known fat content has also been effected and, in this latter case, the "retentate" and the "drained cheesemilk" are actually the same product because the fat content of the milk has been adjusted in such a way that the addition of cream to the liquid retentate is no longer necessary.

The liquid retentate, notably the liquid retentate to be used for the manufacture of soft cheese of the "Camembert" type or "goat cheese" type has the following composition, the figures given being in percent by weight of the liquid retentate:

| | |
|---|---|
| Nitrogen substances | 17 to 24% |
| Total Solids | 23 to 30% |
| Ash | 1.8 to 2.1% |
| Lactose | 3.7 to 3.2% |

The pH of the liquid retentate is about 6.6 to 6.7.

The description given below will indicate the method for determining said figures, with the conventional methods of analysis used in the dairy industry.

For the manufacture of types of cheese other than soft cheese, the above percentages vary and the composition of the liquid retentate has to be adjusted to the composition of the cheese to be obtained.

For fresh cheese, for instance, the percentages of nitrogen substances and total solids are respectively in the range of 6 to 15% and 12 to 20%, by weight of the liquid retentate.

The composition of the "drained cheesemilk" may be modified by varying the amount of cream added to the liquid retentate. When cream is used, it should not be altered as far as its organoleptic qualities are concerned.

In as far as the cheeses obtained according to the invention are concerned, their fundamental characteristic should be noted, which is that they contain a much higher proportion of non-casein proteins, in their total proteins, than do conventional cheeses. Thus, for all cheese having a total solids content no higher than 55% such as soft cheese and including also goat cheese and fresh cheese, the Non-Casein Proteins content accounts, in a cheese made according to the invention, for at least 15% of the total proteins contained in the cheese, whereas in conventional soft cheese this value is only 4 to 5%. The non-casein protein content may be 20% or more in a cheese obtained according to the invention.

Determination of the biochemical constituents as set out herein in accordance with standard procedures were carried out as follows:

The fat content of cheese, cream and whey were determined after extraction with a petroleum ether-diethy ether mixture (International Dairy Federation Standard H).

The nitrogen substances content was determined by the Mikrokjeldahl Method, the nitrogen content being multiplied by the coefficient 6.38. Non-protein nitrogen (N.P.N.) soluble in 12 percent trichloroacetic acid was determined according to White and Davies (White, J.C.D. and Davies, D.T., (1958) J. Dairy Res., 25, 236); to facilitate comparison, the N.P.N. was also multiplied by 6.38 although as a rule this coefficient is only applied to proteins. In some instances the Amido Black method for protein determination was also used (AFNOR, Tour Europe, Paris, 1971 Norme experimentale V 04-216).

The ash content was determined according to the A.O.A.C. method (reference A.O.A.C. Standard, 1945).

The lactose content was determined by Bertrand's method.

Table 1 gives the results of the experiments conducted with various apparatus as illustrated in the Examples set out hereinafter.

| R.P. XP 2 40 | (e) |
| --- | --- |

All the results relating to the levels of Total Solids (T.S.), Total Nitrogen Matter (T.N.M.) which includes all substances containing organic nitrogen (proteins and/or non protein substances) and Ash are given in g of T.S., T.N.M. or Ash per 100 g of milk, liquid retentate and ultrafiltrate. Particular attention is to be paid to the Ratio: T.N.M. of retentate/T.N.M. of milk and also to the ratio: T.N.M./T.S. of retentate compared to the ratio T.N.M./T.S. of milk.

In fact, there is a typical value of the ratio T.N.M./T.S. of the retentate for every particular type of cheese according to the moisture content of this type of cheese (see FIG. 1): for example, in a Gervais type cheese, the optimum value for this ratio is 0.53; in a soft cheese the optimum value for the same ratio is 0.74. Such values are only obtained if there is no lactose retention by the ultrafiltration membranes, i.e. if the lactose content in the aqueous phase of the retentate is close to or equal to the lactose content of the aqueous phase of milk. Only small variations of these values can be permitted if the quality of the cheese is to be good from the organoleptic viewpoint. If the lactose content in the aqueous phase of the retentate is too high, the cheese obtained is too acid and often bitter because there is an accumulation of lactate ions in the aqueous phase of the cheese.

In practice, the determination of this ratio (T.N.M./T.S. of retentate) can be carried out in a very simple way by any Dairy Laboratory: the total nitrogen matter (T.N.M.) is determined either from the nitrogen content using the Microkjeldahl Method (N×6.38) or from the protein content using the Amido Black method. Determination of total solids content is made by drying at 100° C. Such methods are of daily use in dairy plant laboratories. This determination of the ratio T.N.M./T.S. of retentate does represent the best way of ensuring that the ultrafiltration process is working properly.

Not any liquid raw material prepared from milk by ultrafiltration and presenting an increased protein content, when compared to the original milk will necessarily be suitable for conversion into a drained cheese. The

TABLE I

| Characteristics and Results of Low Temperature Milk Ultrafiltration Trials | | | | | | | | |
| --- | --- | --- | --- | --- | --- | --- | --- | --- |
| TRIALS | 1 | 2 | 3 | 4 | 5 | 6 | 7 | 8 |
| Membrane | a | a | b | b | c | b | d | d |
| Membrane surface (in dm²) | 0.39 | 1.44 | 0.39 | 1.16 | 1.16 | 56 | 420 | 420 |
| Pressure (in bars) | 5 | 5 | 5 | 5 | 3.5 | 3.0 | 3.0 | 3.0 |
| Temperature (in °C.) | 4 | 4 | 4 | 4 | 2 | 2 | 2.3 | 3 |
| Duration (in hrs and mins) | 33.15 | 50.30 | 32.35 | 31.45 | 22.50 | 55.45 | 46.00 | 47.00 |
| Amount (per trial in kg) of milk | 0.4 | 2.0 | 0.4 | 4.8 | 6.0 | 100.0 | 1002.0 | 1002.0 |
| processed (in kg/day/sq) | 74.0 | 66.0 | 75.7 | 315.3 | 539.7 | 76.9 | 124.0 | 121.6 |

*in kg/day/sq = in kg of milk treated per day and per sq m of membrane

The membranes used are designated in all Tables by the references a, b, c, d, and e, and the trademark and other characteristics to which these letters correspond read as follows:

| Diaflo UM 20 E | (a) |
| --- | --- |
| R.P. XSB 201 | (b) |
| Diaflo PM 30 | (c) |
| R.P. 30 69 | (d) | composition of such a product must be defined much more precisely.

In fact, for such a conversion to be possible, the liquid raw material must present a very well defined composition as will be explained now. These composition limits are well known in the cheese art.

It has been known for many years that, during the normal cheese making process, the concentration of lactose (or lactose + lactic acid) in the free water of the various products involved (the milk at one end, then the curd, and finally the drained cheese at the other end of the process) must remain approximately constant during the whole cheese making process.

The fact that part of the lactose is fermented into lactic acid during the cheese making process does not deviate from this conclusion because it has been shown that, on a weight basis, 1 gram of lactose gives, by fermentation, 1 gram of lactic acid (McDowell, F. H. and Dolby, R. M., 1935. Studies on the chemistry of Cheddar cheese making. III. The conversion of lactose into lactic acid by starter. J. Dairy Res., 6, 243.). Thus, herein, in specifying protein/lactose ratio—in keeping with prior art practices—no distinction is made between lactose and lactic acid.

The respective roles of free water and bound water in milk, curd and cheese have been studied by a number of authors (see for instance Mocquot, G. 1947. Etude sur l'eau liee des fromages. *Lait*, 27, 576 and Davies, D. T. and White, J. C. D. 1960. The use of ultrafiltration and dialysis in isolating the aqueous phase of milk and in determining the partition of milk constituents between the aqueous and disperse phase. *J. Dairy Res.* 27, 171.). This free and bound water do interfere in the lactose concentration of the curd and cheese Maubois, J.-L., Mocquot, G. et Blanc-Patin, E. 1967. Influence de la concentration du lait sur la quantité de substance sèche de "formage" obtenue après coagulation par la présure. Ann Technol. Agric. I.N.R.A., 16, 287).

The respective lactose and lactic acid contents of whey, curd and cheese have been studied by Czulak (Czulak, J., Conochie, J., Sutherland, B. J. and Van Leeuwen, H. J. M. 1969. Lactose, lactic acid and mineral equilibria in Cheddar cheese manufacture. J. Dairy Res., 36, 93.) who have shown how minute alterations from normal values can lead to defects in the final cheese.

From those publications and from many others one can conclude that: (a) the difference in composition between milk and cheese is that the cheese contains, on a dry weight basis, more fat, more proteins and less lactose and soluble mineral salts than milk; (b) the lactose (or lactose+lactic acid) concentration in the cheese water as well as the ratios lactose/proteins in cheese and finally the total moisture content of the curd and cheese must have well defined values for each particular type of cheese. The values of such parameters, in one cheese type, differ from the values of the same parameters in another cheese type, particularly according to the moisture content of the cheese. But for any given type of cheese, the above-mentioned values can vary only within relatively narrow limits if the quality of the cheese is to be good.

In other words, when we say that "the liquid raw material" obtained after ultrafiltrating milk for a given time, is suitable for conversion into a drained cheese this does mean that the various parameters (water content, lactose/water ratio, lactose/protein ratio) have to be adjusted to the known values which are desirable for the particular type of cheese. Such a result is preferably achieved by conducting the ultrafiltration process under conditions as far as type of membranes, type of ultrafiltration apparatus and procedure, duration of the ultrafiltration process, temperature of the milk and ultrafiltrate, pressure, etc. are concerned that will produce the retentate composition desired.

Outside the range of retentate or drained cheese milk compositions required to make the cheese there will be either too much or too little water, lactose, proteins or mineral salts present in the "liquid raw material" which is to be converted into cheese.

Rennet, which is necessary for clot formation, and lactic acid bacteria are added to the liquid drained cheesemilk in such minute amounts that to start the biochemical modifications which occur in the cheese such as lactic fermentation and ripening; these modifications are produced continuously over a period of time while aging.

The transformation from "liquid" to "gel" results from the enzymatic action which rennet exerts on casein, the main protein in the milk, the casein being transformed into paracasein which is responsible for clot formation.

As far as the composition of the products is concerned, the solids content, protein content, lactose content, mineral content of the liquid "drained cheesemilk" and those of the cheese are practically identical.

On the other hand, the point which we restress is that a satisfactory cheese particularly as far as the organoleptic qualities are concerned (taste, aroma and flavor) can only be obtained if the moisture content and the existing ratios proteins/lactose, proteins/mineral salts, proteins/total solids do have the same well defined values in the "drained cheesemilk" or "retentate" and in the cheese. Such values are characteristic of each particular type of cheese, i.e. one set of values for Camembert cheese, another set of values for Neufchatel cheese, another set of values for Port-Salut cheese, etc.

This is why ultrafiltration should be conducted in a well defined set of controlled conditions if one wants to obtain a drained cheesemilk possessing the right composition for one particular type of cheese.

As an example, one can say that it may sometime be necessary, in order to adjust the composition of the drained cheesemilk to dilute the liquid retentate with water, at a certain stage of the ultrafiltration process in order to get rid of any excess of lactose.

If the necessary precautions are not taken, some of the above-mentioned ratios will be altered in the liquid retentate and, at the end of the process, also in the drained cheesemilk. In particular, there will be a serious risk that the ratio protein/lactose or protein/total solids will be too low and consequently a drained cheesemilk with too much lactose, giving rise to the formation of a very poor quality cheese or no cheese at all will be obtained. As stated, added water can be filtered off to get rid of excess lactose.

It will be appreciated that the process of the invention may be put into practice using various forms of apparatus.

According to one method embodying the invention, the product to be processed is introduced inside porous tubes arranged in bundles and lined inside with the semipermeable membranes under consideration. The water and the soluble constituents (lactose and mineral salts) contained in the milk passing through the membrane and its porous frame are collected on the outer walls of the tube in the form of a filtration liquid. This filtration liquid, which may be called whey, is either used as such, or directed towards another type of membrane having as its purpose enrichment in previously filtered constituents. The retained liquid passing inside the bundle of tubes is thus enriched, particularly in proteins, as it progresses and it is collected at the outlet of the apparatus.

Some plants which use porous tubes have already been proposed and used for removing the salt from sea water; for instance U.S. Pat. No. 3,133,132 can be cited as a reference illustrating this type of plant.

In another method embodying the invention, the product to be processed is introduced at the head of a series of superimposed or juxtaposed modules, each of the said modules being composed of two rigid porous plates acting as a frame and holding a semi-permeable membrane. The liquid which is to be concentrated circulates in the interspace between the two membranes of one module. The so-called filtration liquid is collected in the interspace between two consecutive modules. The liquid which is to be retained and enriched circulates through the stack or the series of modules and is collected on leaving the apparatus.

Equipment comprising modules superimposed of the kind described is illustrated in an article of E.-Lowe et al; (1968) "A reverse osmosis unit for food use" *Food Technology* 22, 915-917. This equipment is described as suitable for treating egg white and fruit juices.

The process of the invention may be performed in a continuous or discontinuous manner. For a discontinuous operation, the batch of liquid dairy product to be processed is placed in contact with the semi-permeable membrane and the product is collected as it leaves the apparatus until the batch of dairy product reaches the desired retentate composition.

The invention perfectly lends itself to continuous operation. The rate of output of the process depends then essentially upon the surface area of the membrane which is employed. The only energy consumed is that required to operate the feed pump. When the process is conducted in a continuous operation, it is used in an apparatus the overall size of which is much smaller than the usual size cheese plant. For example, the ultrafiltration unit used to illustrate this invention takes up about 1 cubic meter for the processing of 5,000 liters per hour.

It is advantageous if the milk or liquid dairy by-product to be processed is in turbulent flow in contact with the membrane. This leads to a more rapid concentration of the protein substances. In a static apparatus with uniform stirring it is observed that at a certain degree of concentration a film is formed on the surface of the membrane which becomes less and less permeable, and which obviously hinders filtration. An appropriate turbulence can be obtained by stirring means.

In the embodiment of the invention which uses modular apparatus, each module may consist of two membranes placed one opposite to the other and supported respectively by a porous frame. The two membranes may be for instance separated by a gap of a few millimeters. In that case, the feeding of the liquid dairy by-product under pressure (for instance 5 kg/cm$^2$) is made into said gap. Because of the thinness of the gap, a laminar flow of the liquid dairy product is formed between the two membranes.

The concentration of the proteins in the liquid retentate product supplied by the process is adjusted to a value in the neighborhood of that found in the type of cheese which it is desired to manufacture. For a given type of membrane and a given surface of membrane the desired concentration, or enrichment, in proteins is obtained by varying, for example, the time during which the starting liquid dairy product passes through. In this case, the composition of the concentrated liquid product may be controlled by measuring a parameter such as protein content, water content, mineral salt content, lactose/protein ratio, total nitrogen material/total solid ratio, etc., or any other physical or chemical property characterizing the desired liquid retentate product in combination with known control techniques. Alternatively the type of membrane or the surface area of the membrane may be varied.

The process of the invention leads to a new liquid retentate product, or liquid enriched cheesemilk in which the protein, lactose, mineral salt and solid concentrations and finally the overall composition of which are substantially those of the desired drained cheese. This new product may be either converted immediately into cheese by the addition of appropriate substances such as rennet, lactic starter, salt, etc. or kept at a low temperature for subsequent processing or transport to a cheese processing plant which may be located elsewhere. This new liquid retentate can be used to manufacture all types of cheese.

The invention makes it possible therefore to obtain cheese having a uniform weight and composition and thus possessing a priori, the best chances for their organoleptic qualities to remain constant. Whey drainage being substantially no longer necessary, it also becomes possible to retain at will in the cheese one component or another from the milk which could be of interest from the organoleptic viewpoint, or from a nutritional or technological standpoint.

With substantially no more whey drainage, it also becomes possible to add to the liquid retentate obtained according to the invention the aids normally used in cheese making, such as rennet, lactic starters, salt, coloring matter, etc., in a definite dose, and very much below, particularly as far as rennet is concerned, the amounts that are normally used in standard cheese manufacturing processes. It also becomes possible, economically to add to the liquid retentate natural substances, particularly enzymes intended to direct and accelerate the subsequent ripening processes, as well as substances having nutritional or taste benefit, that are not present in milk.

The retained new liquid retentate leads itself to the making of all types of cheese because it is possible to adjust as desired the composition and the concentration of each of the components at corresponding values required to make the cheese desired. It is also possible to modify the retentate to create new types of cheese or milk beverages using the process of this invention.

It also becomes possible to effect the preparation of the liquid retentate at points located in the vicinity of the places of production of the milk (e.g. farm, cow shed) and thus effect appreciable savings, particularly where transportation costs are high. Such an arrangement makes it furthermore possible to process the milk while it is in a perfect state of freshness, an essential condition for maintaining the quality of the cheese obtained subsequently.

It should be noted that there is no departure from the scope of the invention if, instead of concentrating certain milk constituents such as traditionally used in cheese manufacture, these same elements are concentrated from by-products from milk, such as buttermilk and whey. By means of the invention, the technological operations leading to the extraction of lactose from milk becomes much simpler.

The following is a generalized illustrative embodiment of certain aspects of the invention.

A. The production of "Drained Cheesemilk"

The skimmed milk (raw or heat treated) at a temperature of about either 4° C. or 50° C., depending upon the experiment being conducted, is ultrafiltered through a semipermeable membrane having such a permeability that only the soluble elements of milk, that is to say essentially lactose, soluble mineral salts and non-protein nitrogen substances, can pass through the membrane.

As a result of this operation two liquids are obtained:

(1) a first liquid passing through the membrane and which, for this reason, is called the ultrafiltrate. Said liquid flowing constantly into a vessel. This liquid resembles "whey" but is devoid of protein substances and of the substance (caseinomacropeptide) which the rennin splits off from the Casein molecule during the coagulation of milk (casein is the main protein component of milk).

(2) a second retained liquid not passing through the membrane, or "retentate", which is a milk enriched in proteins (enriched in Casein and enriched in Non-Casein proteins). Said liquid remaining in the apparatus and circulating at high speed in contact with the membrane during the entire operation, it is collected at the end of the operation.

The ultrafiltration operation is continued until the total protein content of the "retentate" is sufficiently high, corresponding, in the case of soft cheese, to a total content of nitrogen substances (proteins + non-protein substances) of 17 to 24 g per 100 g of "retentate" instead of 3 to 3.4 g normally present in 100 g of milk as it is secreted by the cow's udder.

The product thus obtained is a liquid retentate which can easily be subjected to any measurement of weight, volume, etc. and to various manipulations. Its volume and weight are about one fifth to one seventh of those of the starting milk used. It is possible to keep it for several months at −30° C.: experiments have shown that cheese manufactured from such long kept "retentate" are no different from the cheese manufactured from the fresh "retentate", i.e. one used immediately after it is produced. It is also possible to transport the liquid "retentate" as it is obtained or after it is dehydrated.

The retentate, the pH of which is the same as, or hardly any lower than, that of the starting milk, 6.6 for instance, is heated to a temperature of about 30° to 32° C., and the necessary amount of fresh, unaltered, non rancid cream having in general a fat content in the range of 55 to 65 g per 100 g of cream, was added to it so that the "fat content/total solids content ratio of the final cheese" was of the desired level for instance 45% or 50%.

After thorough mixing of the cream and of the liquid retentate a "drained cheesemilk" product is produced.

B. conversion of the "Drained Cheesemilk" into Soft Cheese.

Either 2% of a conventional lactic acid starter prepared on milk, or 0.02 percent of a mixed frozen concentrated suspension of lactic acid bacteria (*Streptococcus lactis* and/or *Streptococcus cremoria* with *Streptococcus diacetilactis*) are added to the liquid drained cheesemilk.

After the drained cheesemilk has acidified to a pH of approximately 6.1, a few mg of a preparation of Penicilium caseicolum spores was added and then the required amount of commercial rennet (of a "strength" of 1/10,000).

A predetermined amount of drained cheesemilk, for example between 300 and 400 g was then placed in molds having the final shape of the soft cheese, such as molds with a bottom 115 mm in diameter and 35 mm in height. Coagulation occurred within 7 to 10 min. after the addition of the rennet. It was followed by a very rapid hardening of the curd and, 30 min. after coagulation, the cheeses were removed from the molds, placed on slats in molds without bottoms of the same size as the previous one and kept for 14 to 16 hours, during which time their temperature dropped progressively from 30° to 17° C.

The cheeses were then treated under normal conventional conditions for soft cheese manufacture, that is to say they were salted and then ripened in a ripening cellar.

The following examples are given to illustrate the invention.

EXAMPLE 1

In separate experiments 400 ml of skimmed milk, both raw and heat treated at 70° C. for 2 minutes, were introduced into an ultra-filtration cell, available on the market under the trade name "AMICON Model 401", fitted with an AMICON U M 20 E" or ×M 50 or ×M 100 membrane, with an area of 45.36 cm$^2$, the milk having been cooled before hand to 4° C.

The cell was pressurized with nitrogen gas. The gas pressure was increased progressively to 5 kg/cm$^2$ and one started collecting the filtrate.

After 30 to 50 hours, according to the type of membrane used, the pressure was raised progressively to 6 kg/cm$^2$.

After a total duration of 40 to 50 hours, beginning when pressure was first applied to the cell, filtration was stopped, and the liquid retentate was collected. It was then either kept at +2° C. for 16 hours, or processed immediately into cheese. The volume of the liquid retentate was slightly less than 1/5 that of the milk used at the start. Its nitrogenous matter content was slightly more than 5 times that of the starting milk. Its total solids content was of the order of 2 to 2¼ times that of the milk.

EXAMPLE 2

This example illustrates the production of a "Camembert" type cheese from a liquid retentate prepared according to example 1.

To 75 g of the product of example 1 were added 370 mg of CaCl$_2$, the amount of concentrated cream required to obtain in the final cheese a fat to total solids ratio of 45 to 50%, 0.2 g of concentrated lactic acid starter, a few mg of Penicillium spores, 1 g of NaCl, and after heating to 30° C. 0.08 ml of rennet. The whole was thoroughly mixed. Coagulation took place in 5 minutes. A maximum of 10 minutes after renneting, the cheese was moulded in a room in which the relatively humidity was 95%. The cheese was progressively cooled to 14° C. 30 to 60 minutes after renneting, it was possible to remove the cheese from its mold. Ripening was then continued under normal processing conditions.

Soft cheese and all other types of cheese could be produced in similar manner by adjusting the salt, fat, protein and total solid content of the retentate to that required to make the desired cheese.

EXAMPLE 3

400 ml of ordinary cheese whey were introduced into an ultrafiltration cell available on the market under the name of "AMICON Model 401" equipped with an "AMICON U M 20 E" membrane with a surface of 45.36 sq. cm., the whey having been cooled beforehand to 2° C.

The cell was submitted to a nitrogen gas pressure reaching progressively 4 kg/cm² and one then started collecting the filtrate.

13½ hours from the time when the cell was put under pressure, filtration was stopped. The liquid retentate or enriched cheesemilk was collected. Its volume was less than 1/5 of the whey used at the start. Its nitrogen content was approximately equal to 6 times that of the starting whey. Its dry matter content was equal to 2½ times that of the whey. Its ash content was slightly above that of the whey.

EXAMPLE 4

In various experiments 6000 ml of skimmed milk, raw or heat treated at 70° C. for 2 minutes were introduced into the tank of the ultra-filtration apparatus available on the market under the name of "AMICON Model TC₁" equipped with an "AMICON U M 20 E" or "AMICON PM 30", or a polyvinyl chloride or polyacrylonitrile base membrane manufactured by Societe Rhone-Poulene, the membrane had an actual operating area of 116 sq. cm. Before being introduced into the tank, the milk had been either cooled to 2° C. or raised to a temperature between 45° and 50° C.

The vessel containing the milk was subjected to a nitrogen gas pressure of 3½ kg per square cm. The milk was forced to flow at a rate of the order of 2 to 3 liters per minute in the vicinity of the membrane and the filtrate was collected.

At the end of a filtration period which varied from 7 to 30 hours, starting from the time when the apparatus was put under pressure which varied according to the type of membrane employed and the temperature used for the experiment, the liquid retentate was collected. It was then either kept at or cooled to 2° C. and held at this temperature for 16 hours, or heated to 30° C. and processed immediately into cheese. The volume of liquid retentate was slightly less than 1/5 of the milk used at the start. The nitrogen matter content was a little more than 5 times that of the starting milk. Its total solid content was of the order of 2 to 3 times that of the milk used at the start.

To the liquid retentate, enough cream was added to obtain a "drained cheesmilk" of the desired composition and this latter product was converted into cheese of the Camembert or Reblochon type by adding to it the required aids, such as lactic starters, rennet, etc. and by subjecting it to the sequence of process operations corresponding to the type of cheese desired for example by subjecting it to molding, with or without pressing. For example, pressing would be used in making the Reblochon type cheese.

More specifically the amount of concentrated cream necessary to obtain in the final mixture a Fat/Total Solids ratio of approximately 50% was added to the retentate; then a "Reblochon type" starter composed of a mixture of micro-organisms (3 lactic Streptococcus strains; Monilia spores) was also added (2% of the volume of "drained cheesmilk"). The products were carefully mixed, warmed to 37° C. and 0.03% of rennet (strength 1/10,000) was added and the mixture was poured into a mold. Thirty minutes after clotting has occurred the mold, was removed, the cheese was wrapped in cloth and pressed. All the subsequent operations (turnover, putting a new cloth, salting, ripening) were carried out under normal conditions and a Reblochon type cheese was thus obtained.

EXAMPLE 5

The results obtained with the processing of milk by ultrafiltration will now be discussed in greater detail.

A. In trials 1 to 8, summarized in Table 2, the operation was carried out at a temperature of 4° C. or less.

TABLE 2

The composition of products obtained with low temperature ultrafiltration treatment of milk

| | Number of the trial | 1 | 2 | 3 | 4 | 5 | 6 | 7 | 8 |
|---|---|---|---|---|---|---|---|---|---|
| Milk | T.S.* | 8.87 | 8.93 | 8.96 | 9.06 | 9.25 | 9.92 | 8.82 | 8.86 |
| | T.N.M.** | 3.16 | 3.15 | 3.18 | 3.21 | 3.33 | 3.09 | 3.26 | 3.33 |
| | Ash | 0.73 | 0.75 | 0.75 | — | — | — | — | — |
| Retentate | T.S. | 28.84 | 28.40 | 24.10 | 23.24 | 27.52 | 28.35 | 23.61 | 23.31 |
| | Concentration factor for T.S. | 3.3 | 3.2 | 2.7 | 2.6 | 3.0 | 2.9 | 2.7 | 2.6 |
| | T.N.M. | 18.46 | 16.96 | 16.26 | 15.81 | 20.14 | 15.66 | 16.55 | 16.35 |
| | Concentration factor for T.N.M. | 5.8 | 5.4 | 5.1 | 4.9 | 6.0 | 5.1 | 5.1 | 4.9 |
| | Ash | — | 1.99 | 1.84 | — | — | — | — | — |
| Ultrafiltrate | T.S. | 4.89 | 4.64 | 4.89 | 5.36 | 5.48 | — | 5.55 | 5.38 |
| | T.N.M. | 0.14 | 0.17 | 0.13 | 0.12 | 0.13 | — | 0.18 | 0.18 |
| | N.P.N. × 6.38*** | 0.13 | 0.12 | 0.12 | 0.12 | 0.13 | — | — | — |
| | Ash | 0.45 | 0.46 | 0.48 | — | — | — | — | — |

*T.S. = Total Solids (dry extract)
**T.N.M. = Total Nitrogen (material)
***N.P.N. = non-protein Nitrogen The amounts of milk treated per trial ranged from 0.4 kg to more than 1000 kg for membrane surfaces varying from 0.39 dm² to 420 dm². In order to define an optimum level of total nitrogen matter (T.N.M.) in the "drained cheesemilk", various levels of T.N.M. in the "retentate" were tested.

The apparatus used for trials 1 to 3 were laboratory ultrafiltration cells. Uniform stirring of the entire liquid mass undergoing ultrafiltration is not fully obtained with said cells. Under such conditions, approximately 70 kg of liquid were treated per day and per m² of membrane.

In the apparatus used for the later trials (4 to 8) the liquid to be ultrafiltered was circulated in a thin layer (thickness varying from 0.75 to 4 mm) parallel to the membrane surface. The amount of milk processed per day and per m² of membrane increased in substantial proportions. In a same type of apparatus (trials 4 and 5 for instance), the differences observed were due to the particular ultrafiltration properties of each type of membrane and/or to the differences in the condition of operation, such as variations in the flow rate of the liquid along the membrane or to temperature variations occurring during ultrafiltration.

The Total Solids (T.S.) content of the ultrafiltrate obtained varied with the type of membrane used. It was substantially lower with type "a" membranes (average: 4.76 g percent) than with the other types of membranes (average: 5.42 g percent).

The level of Total Nitrogen Matter (N×6.38) (T.N.M.) in the ultrafiltrate increased slightly as ultrafiltration proceeds (and consequently as the protein content of the "retentate" became higher), but it was solely Non-Protein Nitrogen: in fact this level was identical to that of the N.P.N. determined simultaneously on each of the ultrafiltrate fractions obtained.

The amount of ultrafiltrate obtained per hour decreased considerably when the T.N.M. of liquid retentate/T.N.M. in the retentate reached a level of approximately 15 g per 100 g of retentate.

B. Ultrafiltration trails with milk carried out at a temperature of about 50° C. will now be described.

The most representative results of the trials carried out in this temperature zone of about 4° C. and 50° C. are given in table 3, set out below.

TABLE 3

Variation in the composition of the retentate and ultrafiltrate during a low temperature ultrafiltration trial (1)

|  | Milk | Retentate | | | Ultrafiltrate | | |
|---|---|---|---|---|---|---|---|
|  |  | R$_1$* | R$_2$* | R$_3$* | U$_1$** | U$_2$** | U$_3$** |
| T.S. (g.p. 100) | 9.06 | 9.73 | 11.23 | 23.24 | 4.90 | 5.19 | 5.70 |
| Lactose (g.p. 100) | 4.56 | 4.55 | 4.66 | 4.05 | 3.87 | 4.26 | 4.64 |
| T.N.M. (g.p. 100) | 3.21 | 3.92 | 5.07 | 15.81 | — | — | — |
| N.P.N. × 6.38 (g.p. 100) | 0.13 | 0.14 | 0.13 | 0.15 | — | — | — |

*The 2nd and 3rd retentate fraction
**The 2nd and 3rd ultrafiltrate fraction
(1) Membrane b
Temperature 2° C. - Duration 31 hr 45.

If these results are compared with those obtained at 4° C., it will be seen that a very much larger amount of milk is ultrafiltered at 50° C. per day and per m$^2$ of membrane than at 4° C. The magnitude of this increase in the output depends upon the type of membrane and apparatus used. With type "c" membranes (trial 12), the amount of milk treated per day and per m$^2$ of membrane amounted to about 1600 kg, corresponding to three times the amount of milk treated under the same conditions with the same apparatus and the same membrane at low temperature (trial 5). The differences observed in the performances are related to the nature of the membranes and to the hydrodynamic characteristics of the apparatus.

The composition of the products obtained at 50° C. is practically identical to that of the products obtained at low temperature. The only difference lies in the amount of nitrogen substances in the ultrafiltrate. This amount increases slightly and moreover in a different manner according to the type of membrane used, owing to a small quantity of non-casein protein passing through the membrane at the end of ultrafiltration. However, the amount of said substances thus passing into the ultrafiltrate only represented a very small proportion of the total nitrogen substances (T.N.M.) of the milk, less than 1 percent with suitable membranes, the filtering properties of which remain practically unaltered when maintained at 50° C. even for a long period of time.

The variation of the Total Solids content in the ultrafiltrate is comparable to that observed at low temperature.

C. Processing of the retentate into cheese

Table 6 shows the proportions of Total Solids and Total Nitrogen Matter contained in the milk used which remained in the liquid retentate and ultrafiltrate in the different trials.

TABLE 4

Characteristics and results of milk ultrafiltration treatment trials at temperatues of approximately 50° C.

| TRIALS | 9 | 10 | 11 | 12 | 13 | 14 | 15 | 16 |
|---|---|---|---|---|---|---|---|---|
| Membrane | c | b | b | c | e | e | d | d |
| Membrane surface (in dm$^2$) | 0.39 | 0.39 | 1.44 | 1.16 | 1.16 | 56 | 420 | 420 |
| Pressure (in bars) | 5 | 5 | 5 | 5 | 5 | 3 | 3 | 3 |
| Temperature (in °C.) | 48 | 45 | 50 | 50 | 50 | 50 | 50 | 50 |
| Duration (in hr. and min.) | 7.15 8.10 | 12.25 | 6.35 | 10.36 | 10.10 | 7.00 | 7.45 |  |
| Amount of milk processed trial (in kg) | 0.4 | 0.4 | 2.0 | 5.0 | 5.0 | 78.4 | 250.0 | 276.5 |
| (in kg/day/in$^2$)* | 339.5 | 307.7 | 266.7 | 1591.5 | 985.2 | 331.0 | 204.0 | 203.9 |

*kg/day = in kg of milk processed per day and per square meter of membrane

TABLE 5

The composition of the products obtained during milk ultrafiltration treatment at a temperature of approximately 50° C.

|  | Number of the trials | 9 | 10 | 11 | 12 | 13 | 14 | 15 | 16 |
|---|---|---|---|---|---|---|---|---|---|
| Milk | T.S.* | 9.04 | 8.95 | 9.18 | 9.37 | 9.73 | 8.63 | 8.62 | 9.03 |
|  | T.N.M.* | 3.24 | 3.22 | 3.28 | 3.43 | 3.79 | 3.26 | 3.22 | 3.30 |
|  | Ash* | 0.70 | — | — | — | — | — | — | — |
| Retentate | T.S.* | 23.65 | 25.41 | 26.43 | 25.00 | 25.52 | 23.26 | 28.19 | 23.95 |
|  | Concentration factor for T.S.* | 2.6 | 2.8 | 2.9 | 2.7 | 2.6 | 2.7 | 3.3 | 2.7 |
|  | Concentration factor for T.N.M.** | 5.0 | 5.7 | 5.7 | 5.1 | 4.8 | 5.0 | 6.6 | 5.2 |
|  | T.N.M.* | 16.11 | 18.20 | 18.63 | 17.58 | 18.33 | 16.32 | 21.19 | 17.80 |
| Ultrafiltrate | T.S.* | 5.46 | 5.59 | 5.67 | 5.74 | 5.64 | — | 5.60 | 5.54 |
|  | T.N.M.* | 0.15 | 0.16 | 0.18 | 0.19 | 0.29 | — | 0.20 | 0.20 |
|  | N.P.N. × 6.38 | 0.14 | 0.14 | 0.15 | 0.13 | 0.19 | — | — | — |

TABLE 5-continued

The composition of the products obtained during milk ultrafiltration treatment at a temperature of approximately 50° C.

| Number of the trials | 9 | 10 | 11 | 12 | 13 | 14 | 15 | 16 |
|---|---|---|---|---|---|---|---|---|
| Ash | | 0.43 | — | — | — | — | — | — |

*All these results relate to the T.S., T.N.M., and ash contents and are given in g of T.S., T.N.M. or ash per 100 g of milk, retentate or ultrafiltrate.
** The concentration factors are the ratios between contents : concentraton factor for T.S./T.N.M. retentate/T.S. milk and concentration factor for T.N.M. retentate/T.N.M. milk.

In the case of Total Solids, an average of 51 percent was found at low temperature and of 50 percent at a temperature of about 50° C. This proportion was, of course, higher for Total Nitrogen Matter (95 percent) as only (at 2° C.) or almost only (at 50° C.) the Non-Protein Nitrogen Substances of milk (which amounts to about 5 percent of the Total Nitrogen Matter of milk) pass into the ultrafiltrate. It should moreover be noted that a certain amount of these same Non-Protein Nitrogen Substances remain in the retentate, this amount being proportional to the water content of said retentate.

A relatively small amount of "whey" (a "whey" with a high protein content) still drains from the curd, after coagulation of the "drained cheesemilk" has taken place; it represents about 8% by weight of the "drained cheesemilk". It is known that the amount of whey which exudes and is drained off from coagulated milk under usual conditions is very much higher, as it amounts to about 85 percent by weight of the coagulated milk. These two figures, 8 and 85, are highly significant of one of the main differences which distinguish the new process from the conventional cheese-making technique in as far as syneresis and the whey drainage process are concerned.

The Total Solids content of this "high protein whey" which drains from the curd (about twice that of a conventional whey) and its content in Nitrogen substances (6 times that of a conventional whey).

Table 6 gives the T.N.M.&T.S. content of the retentate.

TABLE 6

Proportion of total nitrogen materials and the total dry substance of milk retained in the retentate

| Number of the trials | 1 | 2 | 3 | 4 | 5 | 7 | 8 | Average |
|---|---|---|---|---|---|---|---|---|
| T.N.M. retentate × 100 / T.N.M. milk used | 96 | 95 | 96 | 95 | 95 | 95 | 96 | 95 |
| T.S. retentate × 100 / T.S. milk used | 53 | 53 | 49 | 51 | 50 | 49 | 51 | 51 |

| Number of the trials | 9 | 10 | 11 | 12 | 13 | 15 | 16 | Average |
|---|---|---|---|---|---|---|---|---|
| T.N.M. retentate × 100 / T.N.M. milk used | 96 | 96 | 95 | 9 | 94 | 95 | 95 | 95 |
| T.S. retentate × 100 / T.S. milk used | 50 | 48 | 48 | 50 | 51 | 48 | 51 | 50 |

The high content in Nitrogen Substances in the retentate is due (1) mostly to the non casein proteins retained in the liquid retentate, together with the casein during ultrafiltration and (2) also to the Nitrogen Substances split off from the casein by the rennet (caseinomacropeptide) which would normally (in the conventional procedure) be expelled in the whey, (very little of them remaining in the curd), but which are here mostly retained in the curd, because only such a small proportion of the "high protein whey" is expelled from the curd (8% versus 85%).

The fat content is identical to that of a conventional whey obtained in soft cheese manufacture.

As the whole of the "high protein whey" which drains off from the curd represents about 8% by weight of the "drained cheesemilk" and as this "whey" has an average T.N.M. content of 5 g per 100 g of "whey", the amounts of nitrogen substances which come out from the "drained cheesemilk" represent about 2% of the Total Nitrogen Substances of the skimmed milk used (1.6 to 1.7 kg of skimmilk per cheese). It will finally be observed that 93% (95%-2%) of the Total Nitrogen Matter of the skimmed milk remains in the cheese. This figure of 93% should be compared with the figure of 77% which is the proportion of said same Total Nitrogen Matter passing from the milk into the cheese during conventional manufacture of soft cheese. The gain therefore appears to be quite substantial. Concerning the Solids Not Fat expelled in this same "High Protein Whey" from the "drained cheesemilk" they represent about 4% of the solids of the skimmed milk used. Therefore, 47% (51%-4%) of the solids of the skimmed milk used is found in the cheese obtained according to the instant process. This figure of 47% should be compared with that of 39% obtained for cheese of the same type and having the same water content made in the conventional way. The gain in Solids Not Fat therefore also is quite substantial.

EXAMPLE 6

This example in combination with FIG. 2 shows during one test how skimmed milk plus cream are processed into cheese according to the process of the invention, with preliminary ultrafiltration of the milk.

100 kg of skimmed milk (T.S.32 8.8% T.N.M.=3.2%) was used, and 16.4 kg of retentate was obtained, having the following characteristics:

| T.S. | 27.1 g% |
|---|---|
| T.N.M. | 19.1 g% |

5.5 kg of good fresh cream (fat content: 67.4 g %) was added to the retentate, giving 21.9 kg of "drained cheesemilk" (T.S. 39.5 g %, Fat/T.S. ratio: 50.2%). To this "drained cheesemilk" were then added 0.4 kg of lactic starter, a few mg of a preparation of Penicillium spores and 5.2 ml of rennet ("strength": 1/10,000). Finally 21.0 kg of a cheese was obtained having the following characteristics:

| T.S. | 41.0 g% |
|---|---|
| Fat/Total Solids: | 51.1 g% | were obtained.

During this trial, 5.2 ml of commercial rennet (of a strength of 1/10,000) was used for the coagulation of 21.9 kg of "drained cheesemilk" obtained from 105.5 kg of the starting products (100 kg skimmed+5.5 kg cream). To coagulate the equivalent of 100 kg of starting milk, 5.0 ml of rennet would therefore be required. This amount is only ¼ or 1/5 of the amount normally necessary (20 to 25 ml) with the traditional cheese making process. Various tests have shown that this amount of rennet could still be further reduced and represent only 1/6 of the amount normally used in soft cheese manufacture.

Table 7 gives the results of several series of trials in which the cheeses were weighed 24 hours after manufacture, that is to say, 24 hours after the addition of rennet to the "drained cheesemilk".

TABLE 7

Weights of cheese determined 24 hr. after the addition of rennet to the drained cheesemilk.

| Dates of trials | 22 Oct. | 22 Oct. | 22 Oct. | 11 Jan. | 11 Jan. | 11 Jan. | 15 Oct. | 15 Oct. |
|---|---|---|---|---|---|---|---|---|
|  | 350 | 344 | 350 | 368 | 367 | 367 | 343 | 356 |
|  | 348 | 346 | 350 | 367 | 367 | 368 | 343 | 357 |
|  | 349 | 345 | 350 | 368 | 367 | 368 | 345 | 358 |
|  | 348 | 345 | 347 | 367 | 367 | 368 | 345 | 357 |
|  | 350 | 344 | 349 | 368 | 368 | 368 | 346 | 360 |
|  | 349 | 344 | 350 | 367 | 367 | 367 | 344 | 358 |
|  | 350 | 344 | 352 | 367 | 368 | 368 | 343 | 358 |
|  | 349 | 345 | 350 | 367 | 367 | 367 | 343 | 358 |
|  | 349 | 344 | 351 | 368 | 368 | 368 | 344 | 358 |
|  | 349 | 344 | 349 | 368 | 369 | 369 | 344 | — |
| Average | 349.1 | 344.5 | 349.8 | 367.5 | 367.5 | 367.8 | 344.0 | 357.8 |
| Variance | 0.5 | 0.5 | 1.7 | 0.3 | 0.5 | 0.4 | 1.1 | 1.2 |
| Standard deviation | 0.7 | 0.7 | 1.3 | 0.5 | 0.7 | 0.6 | 1.1 | 1.1 |
| C.V. in percent | 0.2 | 0.2 | 0.4 | 0.1 | 0.2 | 0.2 | 0.3 | 0.3 |

The amounts of "drained cheesemilk" in the molds was varied from one trial to another but, within each trial, the amount of "drained cheesemilk" remained constant.

It can be seen that the variations in the weight of cheese was no greater than 3 g, the standard deviation being 0.9 g and the variation coefficient from 0.2 to 0.4%.

With the conventional cheesemaking process, the deviations in weight between cheeses of the same batch were as much as, and often greater than, 30 g, the standard deviation being 12 g and the variation coefficient 4%.

The organoleptic qualities were determined by distributing to a taste panel samples of soft cheese made according to the ultrafiltration process of this invention and other samples of cheeses manufactured according to the conventional cheese making process, the latter having been prepared in several factories making soft cheese in Western France.

The traials showed that both categories of samples were given the same scores by the experts as far as organoleptic qualities, such as aroma, taste, texture, are concerned. Although differences were observed between certain batches, no systematic difference could be detected between conventional cheese and ultrafiltration cheese.

EXAMPLE 7

The manufacture of goat's milk cheese.

Skimmed goat's milk (3760 ml) was poured into the tank of an apparatus available on the market under the name of "AMICON MODEL TC 1" equipped with an "AMICON PM 30" membrane having an actual operating area of 116 sq.cm. Before being introduced into the tank, the milk had either been cooled to 2° C. or heated to 50° C. (Table 8)

TABLE 8

Characteristics and results of the treatment of goat's milk by ultrafiltration

| Trials | | 17 | 18 | 19 |
|---|---|---|---|---|
| Membrane | | b | c | c |
| Membrane surface in dm² | | 1.16 | 1.16 | 1.16 |
| Pressure in bars | | 3.5 | 3.5 | — |
| Temperature at °C. | | 2° C. | 50° C. | 50° C. |
| Duration in hours - minutes | | 30 | 5 | 18 |
| Amount of milk treated: per trial (in kg) | | 6.0 | 3.76 | 10.0 |
| in kg/day | | 413.8 | 1555.9 | 1149.4 |
| Milk | T.D.E. in g p 100 g | 8.38 | 8.38 | 8.72 |
| | T.N.M. in g p 100 g | 3.27 | 3.27 | 2.95 |
| | N.P.N. (N × 6.38) in g p 100 g | 0.44 | 0.44 | 0.43 |
| | Casein (p. 100 T.N.M.) | 73.7 | 73.7 | — |
| Retentate | T.D.E. in p p 100 g | 27.51 | 23.01 | 31.88 |
| | T.N.M. in g p 100 g | 19.23 | 15.35 | 17.55 |
| Ultrafiltrate | T.D.E. in g p 100 g | 5.9 | 5.94 | 4.64 |
| | N.P.N. (N × 6.38) in g p 100 g | 0.3 | 0.3 | 0.28 |

The tank containing the milk was put under a pressure of 3.5 kg nitrogen per square cm. The milk was circulated in contact with the membrane at a flow rate of about 2 to 3 liters per minute. The ultrafiltrate was collected under normal conditions.

After less than 30 hrs. at 2° C. or less than 5 hrs. at 50° C., the liquid retentate having a T.N.M. content of 19.2% at 2° C. or 15.4% at 50° C. was collected and the amount of concentrated cream necessary to obtain a Fat/Total Solids ratio of 45% in the final mixture i.e. the "drained cheesemilk" was added to it. A concentrated suspension of lactic acid bacteria (5 g), a few mg of Penicillium caseicolum spores and 0.06 mg of rennet (of a strength of 1/10,000) were also added after warming the "drained cheesemilk" to 21° C. The mixture was molded, maintained at 21° C. for 16 hrs. to 20 hrs., the mold was then removed and the cheese was ripened under normal processing conditions.

EXAMPLE 8

The manufacture of fresh cheese.

An amount of concentrated cream necessary to obtain in the final mixture a Fat/Total Solids ratio of approximately 40% was added to the liquid retentate obtained in the manner described in example 4. The mixture was heated to 72° C., maintained at this temperature for 2 minutes and then cooled to 24° C. A concentrated suspension of lactic acid Bacteria (1 Acidifying Strain, 1 Aromatic Strain), and 0.002% rennet (of a strength 1/10,000), was then added to it. The product thus obtained was maintained at ambient temperature for 24 hours. The curd was then ready to undergo all the normal processing operations used in fresh cheese making, such as homogenizing, addition of coloring matter, flavoring, etc.

EXAMPLE 9

Manufacture of a "lisse" (homogenized) type of fresh cheese.

Six hundred kg of raw skimmilk were introduced in the circulation tank connected to the ultrafiltration apparatus sold on the market by the firm D.D.S. (Denmark). This apparatus was fitted with D.D.S. membranes made of cellulose acetate and having an area of 4.0 sq. meters. The milk temperature was 2° C. When three hundred kg of permeate (ultrafiltrate) were obtained, the ultrafiltration was discontinued.

One hundred kg of the liquid retentate obtained at the same time was heated at 76° C., maintained at this temperature for 20 seconds then cooled to 20° C. and maintained at this temperature. Two percent of a lactic acid Bacteria starter and 1 ml of rennet (strength 1/10,000) were added. The mixture was carefully mixed. Eighteen hours after this addition, 8.5 kg of pasteurized cream having a fat content of 43.5% was incorporated in the curd with the aid of a pump (P.C.M. pump).

Then, the mixture was introduced in a "lisseuse" apparatus i.e. homogenized, packed and cooled to 4° C., and maintained at this temperature until consumption.

EXAMPLE 10

Manufacture of a "faisselle" type of fresh cheese.

Into one hundred kg of the same liquid retentate obtained in the preceding example 9, we added 8.5 kg of raw cream having a fat content of 43.5%. The mixture was heated to 75° C. for 20 seconds and homogenized at a pressure of 90 kg/cm$^2$, then cooled to 20° C. A lactic acid bacteria starter (1.5%) and rennet (0.5 ml strength 1/3,000) were added and carefully mixed with the "drained cheesemilk".

Twenty hours after the addition of rennet, the curd was distributed, with care, into "faisselle pots". Those pots were cooled to 4° C. and maintained at this temperature until consumption.

EXAMPLE 11

Manufacture of a Saint Paulin Cheese.

12 kg of raw skimmilk cooled to 2° C. were poured into the tank of an ultrafiltration apparatus sold by Amicon (USA) and fitted with "hollow fiber PM 30 membranes". When 6 kg of permeate (ultrafiltrate) were obtained, 6 kg of pure water were then slowly added. After this addition of water, 10 more kgs of permeate were again obtained and the liquid retentate was then collected.

To one kg of this liquid retentate with a T.N.M. content of 21.3 g p. 100 g of liquid retentate and a T.S. content of 26.9 g p. 100 g of liquid retentate 300 g of raw cream with a high fat content (68 g p. 100) was added. The mixture was heated to 72° C., maintained for 20 seconds at this temperature and cooled to 34° C. Two percent of a lactic acid bacteria starter and 0.2 ml of rennet (strength 1/10,000) were added and carefully mixed. The mixture was distributed into molds. One hour after the addition of rennet, the curd from each mold was put into a cloth, and pressed. Then the cheeses were treated under the same conditions as in normal practice for this Saint Paulin type of cheese.

The above detailed description shows that one of the main characteristics of the cheese manufacturing process of the invention is to considerably reduce the whey drainage process, an operation necessary to obtain conventional soft cheese.

This results in a notable increase in the "yield" of the conversion of milk into cheese due, notably, to the retention of non casein proteins in the cheese, such as $\beta$-lacto globulin, $\alpha$ lactalbumin, etc. that are removed with the whey in the prior art cheese making processes.

In the conventional cheese making process, said proteins (about 4.5 g per kg of milk) do not coagulate under the action of rennet and remain in solution in the whey. As this whey is expelled from the cheese in a proportion of 80 to 90%, the proteins in cheese come essentially from the caseins, that is to say the proteins which, contrary to the aforementioned ones, coagulate under the action of rennet. The small amount of non casein proteins remaining in conventional cheese corresponds to the amount of whey retained in this cheese, and thus only amounts to about 1/10 or 1/5 of the amount of non casein proteins contained in the initial milk.

With the ultrafiltration process, on the contrary, the non casein proteins were entirely or almost entirely retained in the liquid retentate and then, therefore, in the "drained cheesemilk", the whey drainage out of said "drained cheesemilk" (after clotting has occurred) is in practice very slight compared with that of the conventional process. For this reason, although the non casein proteins do not clot with rennet, a high proportion of them remain in the final cheese product.

As to the nitrogen substances (caseinomacropeptide, etc.) which are split off from the Kappa casein by the rennet when clotting occurs, they obviously also remain in the cheese instead of being removed with the whey as normally occurs in the conventional process. This means that about 1 g of nitrogen compound substances is retained in the cheese per kg of milk used.

The analytical results obtained with the milk, the liquid retentate, the ultrafiltrate, the "drained cheesemilk" the cheese and, finally the small amount of drained "high protein whey" confirm this characteristic.

For a number of years non casein proteins have been reincorporated into cheese; by heating the whey up to about boiling point under suitable pH conditions, a portion of the non casein proteins is precipitated, and can be decanted or, preferably, be centrifuged. But, with this process, only a portion of the non casein proteins of the milk is recovered, and also they are modified by the heating which they had to undergo. Experience has shown that the incorporation of too much of these heated non casein proteins into the cheese does not have a good effect on its organoleptic qualities (notably on its texture). In the case of ultrafiltration (at 2° or even 50° C.) the non casein proteins do not undergo any appreciable modification and their presence in the cheese has no detrimental effect on the organoleptic qualities of the cheese.

In soft cheese making, the whey contains a certain amount of fat (about 0.1%) representing a "loss" of 3 to 4% of the fat present in the starting milk. Said fat could be partly recovered by passing the whey through a separator to skim it. But whey cream does not possess the same organoleptic qualities which are so highly valued in cream from milk, and the skimming operation represents an additional expense; so very often the whey of soft cheese is not skimmed.

In the process of this invention, the addition of cream to the liquid retentate to obtain the "drained cheesemilk" and clotting, followed by a limited whey drainage process, considerably reduces the loss of fat in the whey.

By suitably adjusting the composition of the "drained cheesemilk" from the point of view of Fat/Total Solids ratio, a cheese is subsequently obtained having the exact amount of Total Solids and Fat required by law. The "safety margin" which the manufacturer has to allow for in the conventional technique and which represents a loss due to the lack of precision of the said conventional technique, is thus reduced.

The increased yield resulting from the incorporation of the non casein proteins and of the caseinomacropeptide, the suppression of loss of Fat and Total Solids represent one of the most notable advantages of the ultrafiltration process applied to make soft cheese.

The increased yield resulting from the incorporation of non casein proteins and other nitrogen compound substances also results in the use of a larger amount of Fat in the cheese, per liter of milk processed, which correspondingly reduces the amount of butter to be manufactured by the diary. In the present economical context this reduction appears to be an advantage.

The increase in the amount of milk fat used in cheesemaking can have other consequences on the "breading of milch animals". Indeed, as things are at the moment, milk, as it is produced by the milch animal, has, in many cases and notably in that of the manufacture of soft cheese, a Fat/Protein Ratio too high for the requirements of cheese making. A modification of this ratio through appropriate cattle breeding would only appear to become effective after long and costly efforts. The problem is solved to a certain extent when all the proteins in milk can be used for cheese. This improved "technological" equilibrium between proteins and fat should also be taken into account when working out the diet of milch animals.

A slightly higher level of lactose observed in some of the experiments in the ultrafiltrate at the end of the operation did not lead to any detectable defect in the quality of cheese. But it is important to note that said lactose content can easily be adjusted, if need be, by adding a predetermined amount of water to the milk either prior to ultrafiltration or during the ultrafiltration itself; this was confirmed in several trails. In this way the correct lactose content in the curd can be obtained; this resulting also in a correct ratio of T.N.M./T.S. in the liquid retentate as well as in the drained cheesemilk and in the curd.

The fact that the amount of rennet necessary to clot the drained cheesemilk is about 1/5 of that necessary to clot milk indicates that the dose of rennet is a function of the volume or weight of the milk or drained cheesemilk but that the amount of casein present in one or the other of said liquids has little or no influence on it. The 80% saving of rennet compared with the conventional procedure lowers the cheese maker's processing cost, rennet accounting for about 0.2% of the wholesale price of cheese, and can also contribute to solving the problem of the world-wide shortage of rennet.

The advantages resulting from the fact that whey drainage is suppressed, that yield is increased etc., can be noteworthy in cheese making processes other than those related to soft cheese.

The process can, in fact, be advantageously applied to all cheese having a Total Solids content approximately that of soft cheese or lower. Some examples will be mentioned:

(a) the drained cheesemilk can be used as a basic product for the manufacture of the so-called fresh cheese whose solids not fat content is lower than, or equal to, that of soft cheese.

As for soft cheese, the process enables non casein proteins to be added to the casein without any use of drastic heating which would modify these proteins. Then again, the whey drainage can be considerably reduced, if not completely suppressed, and the production and manipulation of large amounts of acid whey, with all the various drawbacks which this entails (corrosion, lot of work for cleaning, etc.).

Our experiments show, on the other hand, that the organoleptic qualities of the products obtained are comparable to those found in conventional soft and fresh cheese.

(b) ultrafiltration and preparation of the drained cheesemilk were successfully carried out with goat's milk. It is known that goat's milk contains proportionally less casein and more whey proteins than cow's milk. Therefore, a still greater increase in cheese yield (compared with the conventional process) is obtained than with cow's milk. Results of typical trials are given in Table 8.

The process can also be used in the manufacture of cheese having a Total Solids content higher than that of soft cheese.

It should also be noted that the ultrafiltrate, i.e. "whey" devoid of proteins, has the following advantages with respect to normal whey:

that of having a pH of 6.5 and therefore of not being too acid; the acidity of conventional whey usually presents problems in as far as use of the whey for preparing various by-products is concerned, and also in as far as it promotes corrosion and raises cleansing difficulties. This new "whey" is therefore, on the whole, easier to use and there is a possibility of using it as a starting material for the preparation of other products. In any case, it represents a smaller and less offensive potential source of pollution than normal whey; the Biological Oxygen Demand (B.O.D.) is in fact reduced by 20% owing to the fact that this "whey" no longer contains whey proteins.

The essential characteristics of the process and the products obtained in this invention will be summarized.

By subjecting milk (preferably with fat removed) to ultrafiltration with membranes, a liquid retentate is obtained containing five to six times more proteins than the starting milk.

By adding an amount of high fat content cream to said product, a liquid drained cheesemilk is obtained having substantially the composition of a soft cheese at the end of whey drainage while remaining liquid.

A small amount of rennet, about 1/5 of the dose normally necessary for the same amount of cheese is sufficient to obtain coagulation.

After ripening, the cheese has organoleptic qualities comparable to those of control cheeses prepared according to the conventional process.

The increased yield capacity of milk into cheese, notably owing to the retention of whey proteins, the reduction of losses of fat and non fat solids compared with conventional process as well as other advantages at the technological level, and the reduction of pollution by effluents, all represent very definite advantages.

What is claimed is:

1. A process for making a fat containing rennet coagulated cheese from milk, the cheese containing substantially all the casein and soluble proteins of the milk, which comprises separating the milk by ultrafiltration into a filtrate and a liquid retentate, by flowing the milk over semipermeable membranes by introducing said milk into a series of modules, each consisting of porous plates, each of said porous plates serving as a frame for one of said semipermeable membranes and said plates being separated by a specific interval to form an interspace, whereby said milk is separated into a filtrate, which is collected in spaces separating pairs of consecutive modules, and into retentate which circulates through said modules and becomes more concentrated in proteins as it circulates, the semipermeable membranes having an average pore diameter falling in the range which will permit water, lactose and soluble mineral salts contained in the milk to pass through the membrane as a filtrate up to 30 m$\mu$, the flow of the liquid within the interspaces being sufficient to hinder film formation on the surface of said membranes which would prevent the flow of said water, lactose and soluble mineral salts passing through said membranes, said separation occurring at a pressure of 1 to 50 kg/cm$^2$, and such that substantially all the casein and soluble proteins of said milk are retained in the liquid retentate;

continuing said separation until a free flowing liquid retentate, collected separately from said filtrate, is obtained which has substantially the same total protein concentration and non-protein soluble constituents concentration as is known to exist in the milk derived components of a desired natural cheese at the end of the whey draining process, and thereafter adding sufficient rennet to said retentate to cause coagulation and cheese formation.

2. The process of claim 1, wherein the liquid being processed is maintained in a turbulent condition adjacent the semipermeable membrane.

3. The process of claim 1, wherein lactic acid starter, is added to said retentate before addition of the rennet.

4. The process of claim 1, wherein said milk is contacted with said semipermeable membrane under laminar flow conditions.

5. The process of claim 1, wherein said milk is selected from the group consisting of cows milk, goats milk, and ewes milk.

6. The process of claim 1, wherein said membrane is formed of a material selected from the group consisting of cellulose acetate, polyvinyl chloride, polyacrylonitrile and polyolefins.

7. The process of claim 1, wherein the milk subjected to the process is skim milk and cream is added to the retentate.

8. A process for making a fat containing rennet coagulated cheese from milk, the cheese containing substantially all the casein and soluble proteins of the milk, wich comprises:

separating the milk by ultrafiltration into a filtrate and a liquid retentate, by flowing the milk over semipermeable membranes by introducing said milk into a plurality of porous tubes, each of said tubes being lined inside with a semi-permeable membrane, and wherein said filtrate is obtained by being passed through said membranes and said porous tubes, and is collected on the outer wall of said tubes, and said retentate inside the tubes becoming more concentrated in proteins as it passes through said tubes, the semipermeable membranes having an average pore diameter falling in the range which will permit water, lactose and soluble mineral salts contained in the milk to pass through the membrane as a filtrate up to 30 m$\mu$, the flow of the liquid within the tubes being sufficient to hinder film formation on the surface of said membranes which would prevent the flow of said water, lactose and soluble mineral salts passing through said membranes, said separation occurring at a pressure of 1 to 50 kg/cm$^2$, and such that substantially all the casein and soluble proteins of said milk are retained in the liquid retentate;

continuing said separation until a free flowing liquid retentate, collected separately from said filtrate, is obtained which has substantially the same total protein concentration and non-protein soluble constituents concentration as is known to exist in the milk derived components of a desired natural cheese at the end of the whey draining process, and thereafter adding sufficient rennet to said retentate to cause coagulation and cheese formation.

9. The process of claim 8, wherein the liquid being processed is maintained in a turbulent condition adjacent the semi-permeable membrane.

10. The process of claim 8, wherein lactic acid starter is added to said retentate before addition of the rennet.

11. The process of claim 8, wherein said milk is contacted with said semipermeable membrane under laminar flow conditions.

12. The process of claim 8, wherein said milk is selected from the group consisting of cows milk, goats milk and ewes milk.

13. The process of claim 8, wherein said membrane is formed of a material selected from the group consisting of cellulose acetate, polyvinyl chloride, polyacrylonitrile and polyolefins.

14. The process of claim 8, wherein the milk is subjected to the process is skim milk and cream is added to the retentate.

15. A process for making a fat containing rennet coagulated cheese from milk, the cheese containing substantially all the casein and soluble proteins of the milk, which comprises:

separating the milk by ultrafiltration into a filtrate and a liquid retentate by flowing the milk over a first face of a semi-permeable membrane by introducing said milk into a module containing a porous plate, said porous plate serving as a frame for said semipermeable membrane, and whereby said milk is separated into a filtrate which passes through the membrane and is collected in a space on the opposite face of said membrane and into retentate which recirculates through said module and becomes more concentrated in proteins as it recirculates, the semi-permeable membrane having an average pore diameter falling in the range which will permit water, lactose and soluble mineral salts contained in the milk to pass through the membrane as a filtrate up to 30 m$\mu$, the flow of the liquid over said first face of said semi-permeable membrane being sufficient to hinder film formation on the surface of said membrane which would prevent the flow of said water, lactose and soluble mineral salts passing through said membrane, said separation occurring at a pressure of 1 to 50 kg/cm$^2$, and such that substantially all the casein and soluble proteins of said milk are retained in the liquid retentate;

continuing said recirculation and separation until a free flowing liquid retentate, collected separately from said filtrate, is obtained which has substantially the same total protein concentration and non-protein soluble constituents concentration as is known to exist in the milk derived components of a desired natural cheese at the end of the whey draining process, and thereafter adding sufficient rennet to said retentate to cause coagulation and cheese formation.

16. The process of claim 15, wherein the milk subjected to the process is skim milk and cream is added to the retentate.

* * * * *